June 30, 1942.  D. W. VINSON  2,288,333
APPARATUS FOR PURIFYING PETROLEUM OIL
Filed May 24, 1937   2 Sheets-Sheet 1
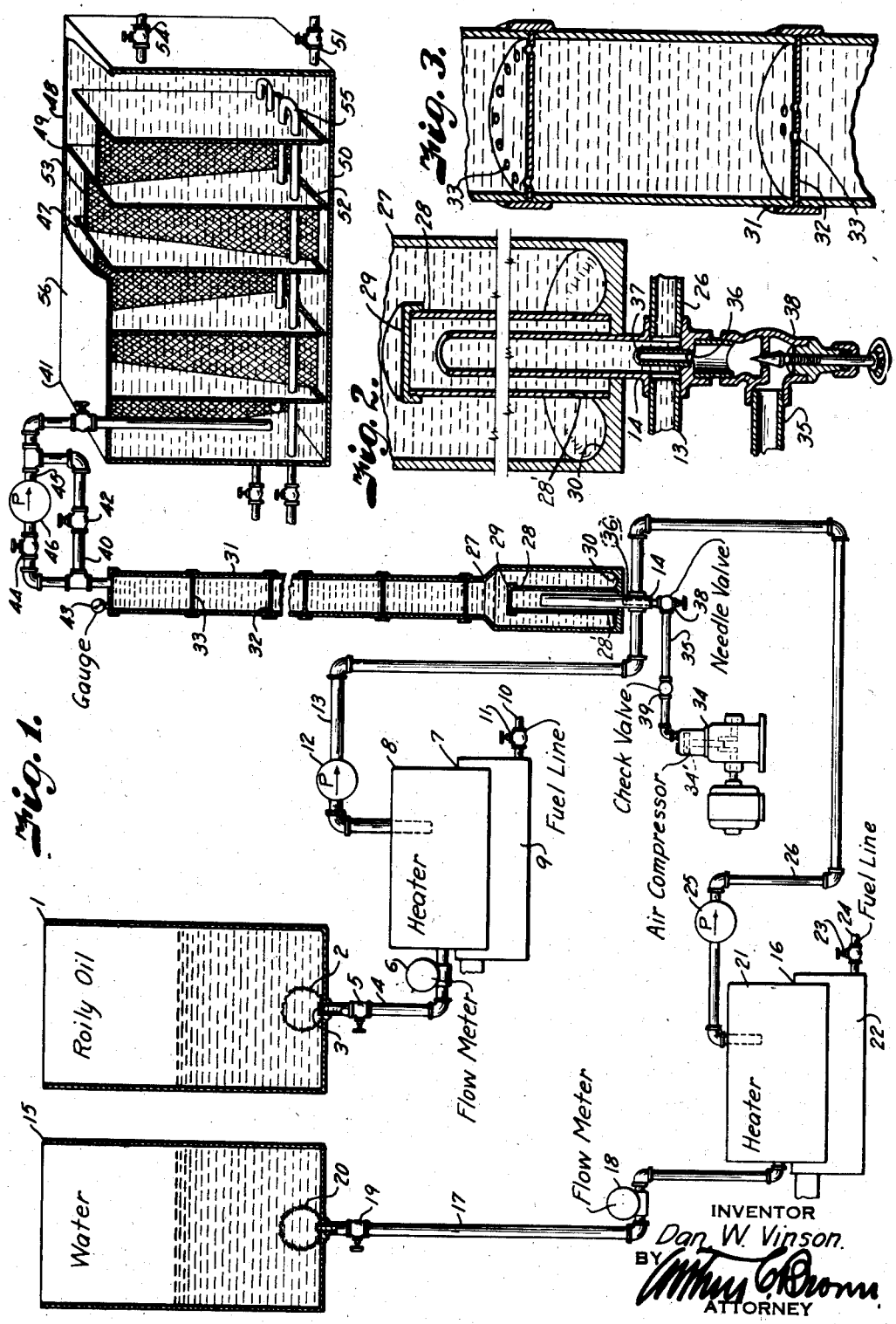
INVENTOR
Dan W. Vinson.
BY
ATTORNEY

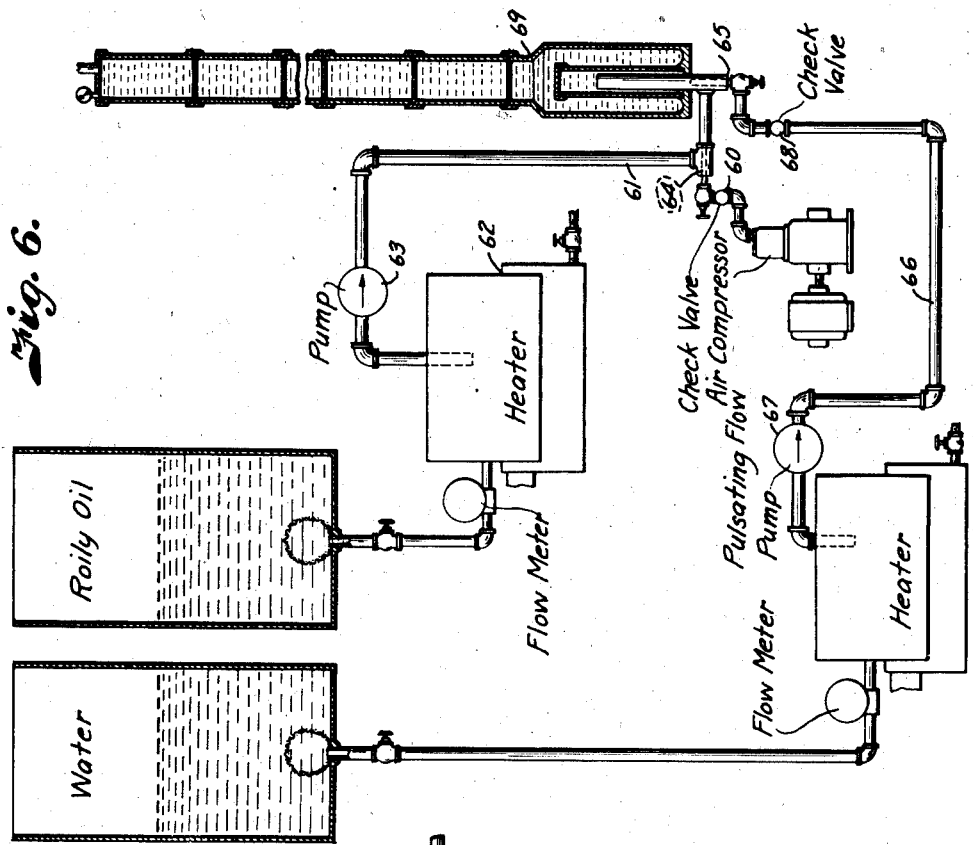
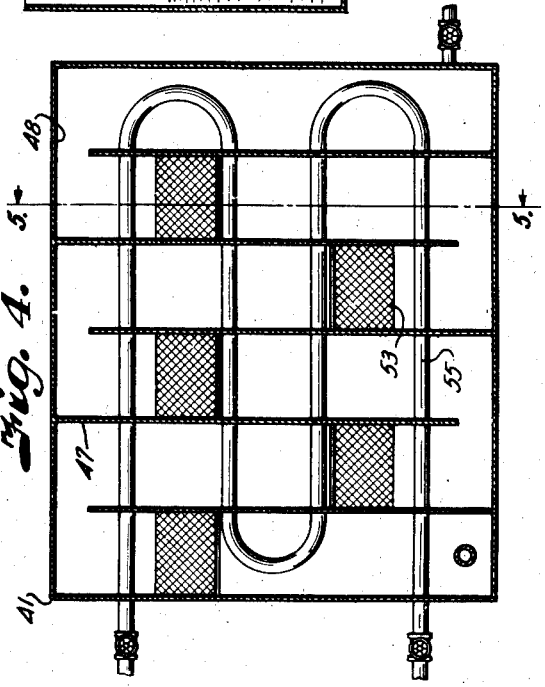
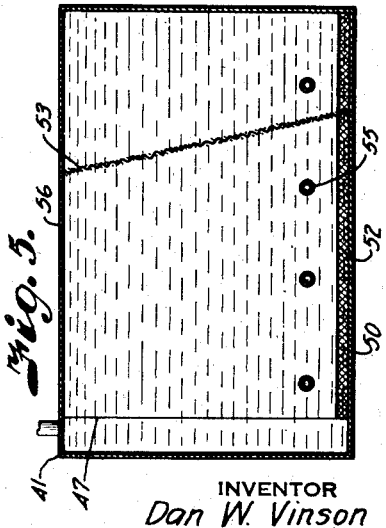

Patented June 30, 1942

2,288,333

UNITED STATES PATENT OFFICE 2,288,333

APPARATUS FOR PURIFYING PETROLEUM OIL

Dan W. Vinson, Oklahoma City, Okla., assignor to Mechanical Oil Recovery, Incorporated, Oklahoma City, Okla., a corporation of Oklahoma Application May 24, 1937, Serial No. 144,445

8 Claims. (Cl. 210—47)

My invention relates to apparatus for purifying petroleum oil.

Petroleum oil produced from underground sources contains impurities, including water and earths, or their salts, that degrade the oil and, if present in sufficient quantities, attack the well equipment, the pipe lines through which the oil is run and the equipment in which the oil is refined. In some instances the foreign matter, if present in crystalline form in the oil, will not settle out with free water and solid impurities, and frequently water is present in the form of tight emulsion which can not be resolved by heating or other ordinary methods and, settling in storage tanks, must be removed for disposal as waste.

It is the object of my invention to remove such foreign matter so that all of the oil may be recovered as a useable product of the wells, free from the impurities which damage the wells, transportation and refining equipment, and which degrade the oil, the present application being a continuation in part of my application for patent on "Method of recovering oil," Serial No. 47,076, filed October 28, 1935.

Emulsions of the character referred to are usually formed by agitation of the oil and water which are produced together and forced from the well by gas pressure or pumped therefrom. The component parts of the well fluid produced under such conditions consist of free water, free oil and an emulsion composed of dispersed droplets of water encased in films of an emulsifying agent. The free oil and water may be separated by gravity, but the minute droplets of water of the emulsion can not break the films of emulsifying agent so that they may coalesce with other droplets to form drops of sufficient size to separate from the oil by gravity.

Various methods have been employed for destroying or removing the films from the dispersed droplets to free them for separation. One of such methods consists of heating the emulsion to weaken the films until the droplets are able to break through; however, the temperatures required for this method cause loss of low boiling point fractions of the oil by evaporation.

Chemical treatment has also been employed for either destroying or weakening the films of the droplets until the films break. However, chemicals are liable to degrade the oil or attack and injure the tanks, pipe lines and other equipment.

Subjecting the emulsions to vibration will cause some emulsions, having thin or weak films encasing the droplets, to break, allowing the droplets to coalesce, but tight emulsions will not respond to this treatment alone.

I have discovered that by heating the emulsions to a point well under the evaporating point of the light ends of the oil, mixing the hot emulsion having heat thinned films with hot water under a turbulent flowing condition, and intermittently injecting air or other fluids into the flowing mixture so that the mixture is subjected to a series of shocks or impacts, the films encasing the droplets will be broken and the oil and water readily separated by gravitation. The intermittent shocks imparted to the flowing mixture of water and emulsion effect alternate compression and expansion of the dispersed droplets and the aeration and turbulence imparted to the flowing mixture by the jets of fluid cause the droplets to shatter their films and coalesce, the shocks delivered to the flowing water and emulsion mixture effecting a continued vibration along the path of the mixture which aids the droplets in coalescing with the surplus of water added to the emulsion and preventing re-forming of droplets. The turbulence and shock effective for breaking the emulsions and preventing its recurrence also frees salts contained in the oil from the oil so that the salts precipitate from the oil and settle out from the oil or pass off therefrom in solution in the water.

The preferred form of apparatus embodying my invention is illustrated in the accompanying drawings, wherein:

Fig. 1 is a diagrammatic view of the apparatus, parts being broken away and shown in vertical section for better illustration.

Fig. 2 is an enlarged detail sectional view of the injector for delivering the impacting fluid to the emulsion.

Fig. 3 is an enlarged detail view of adjacent baffle plates in the tower shown in Fig. 1.

Fig. 4 is a horizontal section through the settling tank, showing the arrangement of baffles therein.

Fig. 5 is a vertical section through the settling tank on the line 5—5, Fig. 4.

Fig. 6 illustrates a modified form of the apparatus in which additional impacts are delivered to the emulsion.

Referring more in detail to the drawings:

1 designates a tank adapted for holding oil, such as an emulsion of the character referred to for delivery to the treating apparatus. Mounted in the bottom of the tank is a filter 2, preferably of wire gauze, which surrounds an opening 3 to a line 4 equipped with a flow control valve 5 and a flow meter 6 for controlling the amount of oil delivered from the tank to a heater 7. The heater may be of any suitable type but preferably consists of a drum 8, into which the line 4 empties, the heater being mounted on a fire-box 9 supplied with fuel from a line 10 having a fuel control valve 11 therein.

The temperature in the heater, particularly when the oil heated therein is in the form of emulsion, is maintained preferably under 200° F. dependent on composition of the fluid, the hot oil being drawn from the drum by a pump 12 and forced through a line 13 to a mixing chamber 14 in which water is mixed with the oil as later described.

It is desirable to mix the oil with fresh water, although brine may be used, so that when the films on the droplets are broken the water released from the emulsion may readily coalesce with the added water. The added water is supplied from a tank 15 connected by a line 17 with a heater 16 wherein the water is maintained at about the same temperature as the oil taken from tank 1. The line 17 is provided with a flow meter 18 and a valve 19 for controlling the volume of water mixed with the oil. Mounted in the bottom of the tank is a gauze filter 20 which is similar to the filter in the oil tank.

The water heater is similar to the oil heater, previously described, the water emptying into drum 21 which is mounted on a fire-box 22, the temperature of the water being regulated by a fuel control valve 23 in the fuel line 24 leading to the fire-box. The heated water is drawn from the drum by a pump 25 and forced through a line 26 to the mixing chamber 14 where the water is discharged against the stream of oil entering the chamber, the flow of the water being opposite to that of the oil and meeting the oil at about the center of the mixing chamber.

The mixing chamber extends coaxially through the bottom of a tower 27 into a hood 28 having a closed top 29, whereby mixture forced against the top 29 is turned back for reverse flow through the annular space in the bottom of the hood about the lower portion of the mixing chamber and through orifices 28' in the lower portion of the hood into the lower portion of the tower 27. The orifices 28' are downwardly and outwardly inclined and the bottom of the tower concaved to reverse direction of flow of the fluid upwardly into the tower. The upper portion 31 of the tower is reduced in diameter and provided with spaced baffles 32 having orifices 33 staggered in relation to each other in successive baffles, so that the course of the fluid is altered as it travels from one level to another, thereby lengthening the travel of the fluid through the tower.

Located adjacent the oil and water supply and heating equipment is an air compressor 34 having a crank actuated piston 34' adapted for delivering air through a line 35 to a jet nozzle 36 extending coaxially into the mixing chamber and terminating at a point 37 above the level at which the water and oil are delivered to the chamber, at pressures of approximately eighty pounds to the square inch or under, dependent on nature of the oil, so that the air, under control of the needle valve 38 in the jet nozzle and a back check valve 39 in the feed line, assists in effecting thorough mixture of the oil and water, aerates the mixture and propels the mixture against the hood top 29 and through the system. The compressor is of a type to deliver intermittent jets or slugs of air to the mixing chamber which, impacting the mixture, as with hammer blows, tend to rupture the films confining the water droplets when the oil is in the form of emulsion.

A line 40 provided with a valve 42 and pressure gauge 43 leads from the top of the tower to a settling tank. When it is desirable to operate under a low pressure or under vacuum in the tower, flow from the tower is diverted through a by-pass line 45, by means of a pump 46 and under control of the valve 42 in line 40 and a valve 44 in the by-pass line.

The treated fluid will separate in any conventional settling tank; however, I prefer a tank as shown in Figs. 1, 4 and 5, having a series of vertical baffles 47 for lengthening the travel of the fluid. The baffles are alternately attached to opposite sides 48 of the tank, as at 49, and spaced from the bottom 50 in order that the water settling out in any of the compartments may flow directly to a drain 51 located near the bottom and at the outer end of the tank. Screens 52 are provided in the spaces between the lower edges of the baffles and bottom of the tank to prevent any disturbance in the liquid in one passage from being transmitted to the adjacent passage. Screens 53 are set between the baffles adjacent the outlet of each passage, inclined against the flow so that all foreign matter will move downward thereon to speed separation, and assure that only clean oil will be drawn from the oil drain 54. Use of this type of tank will permit continuous operation and the separation may be promoted, particularly when treating heavy oils, by heating the liquid in the settling tank by a steam coil 55, the loss of low boiling point fractions being prevented by a tight cover 56 for the tank.

In practicing my invention, oil and water are drawn from their respective tanks into their respective heaters wherein the liquids are maintained at temperatures of preferably not over approximately 165° F., dependent on the nature of the oil. The hot oil and water are drawn from their respective heaters and pumped through the separate lines to the mixing chamber where they are discharged against each other to thoroughly mix the hot water with the hot oil and force the mixture up into the chamber of the tower.

Air supplied by the compressor is delivered in intermittent jets through the check valve and into the flowing mixture of oil and water at a level sufficiently above that of intake of the fluids to avoid back pressure on the supply lines and so as to impel the mixture by blows of sufficient force to rupture films encasing the water droplets and allow the droplets to coalesce with the water in the mixture when the oil is in the form of emulsion.

The mixture is driven against the top of the hood, back to the bottom of the hood, then on through the outer orifices onto the concaved bottom of the tower, thereby adding reversals of flow which further tend to disrupt the films referred to. The fluid then moves upwardly in a zig-zag path through the tower and through the orifices in the baffles therein. The back pressure on the fluid in the tower is controlled by the valves 42 and 44 and the pump 46, heavier and tighter emulsions requiring much higher pressures (eighty pounds or above) than lighter emulsions.

After leaving the tower, the treated mixture is delivered for final separation to the settling tank 41 where it moves through a series of passages formed by the baffles 47 and through the inclined screens 53 in each passage. The water and sludge gradually settle as the mixture progresses through the tank and as it reaches the end thereof the oil, forming an upper layer, is drawn off through the oil drain 54 and the lower layer of water through the water drain 51.

It has been found that intermittency of supply of air from the air compressor, and of the pulsating pump of the alternate form of apparatus, continues throughout the system so that by adjusting the valves in the lines a back pressure is created whereby the liquid in the flow system functions as an anvil against which the water droplets are crushed by the air jets to break the films and thus free the dispersed water for coalescing with the free water so that the water may separate from the oil in the settling tank.

In Fig. 6 I have shown a modified form of apparatus embodying my invention. In this form of apparatus the air impact is delivered from the compressor through a check valve 60 into the oil line 61 leading from the heater 62 and pump 63 by a jet nozzle 64. This aerates the oil as it is forced into a mixing chamber 65 where it is subjected to an impact of hot water.

The water is heated in the same manner as in the preferred form of the invention and pumped through a line 66 by a pulsating flow pump 67 into the mixing chamber 65. A check valve 68 is provided in the line 66 to stop any rebound of the water so that the full force of the blow delivered by the pump is transmitted to the oil.

The flow of the treated mixture through the tower 69 to the settling tank is the same as in the preferred form of the invention.

In this form of apparatus the impacts transmitted to the oil by the air jets break or distort the films surrounding the water droplets and before the film can reform, it is completely shattered by the impact of the water and the droplets freed for coalescence with the fresh water supply.

While I have referred to the heating of the oil as a preliminary step to the treatment described, there are many oils which may be treated without the preliminary heating, and I do not wish to be limited to such a preliminary step.

While I have described my invention as particularly relating to breaking of emulsions, similar procedure may be followed for removal of salts or any solid impurities from the oil.

What I claim and desire to secure by Letters Patent is:

1. Apparatus of the character described including a mixing chamber having an outlet for liquids mixed therein, a treating vessel connected with the mixing chamber, a hood supported over the outlet of the mixing chamber and having outlet to the treating vessel offset from said outlet of the mixing chamber, means for introducing oil to be treated and a separate liquid into said chamber through separate lines for flow in a stream to the treating vessel, a nozzle terminating in the mixing chamber at the down-stream side of the connection of said lines with the mixing chamber, and means for intermittently delivering a gaseous fluid under pressure to said nozzle, said treating vessel having an outlet for said liquids.

2. Apparatus of the character described, including a treating vessel, a mixing chamber, means for delivering water and oil separately and in opposite directions into the mixing chamber under pressure to create impact of the liquids one against the other, a nozzle leading from said chamber to the treating vessel, means for intermittently delivering a gaseous fluid under pressure to the nozzle for impelling the mixed liquids to the treating vessel, a setting vessel in receiving relation with the treating vessel, and means for drawing off separated liquids from the settling vessel at different levels.

3. Apparatus of the character described, including a treating vessel, a mixing chamber, oppositely arranged means for delivering water and oil separately to said chamber in different directions to effect impact of one liquid on the other, a nozzle leading from the mixing chamber to the treating chamber, means for intermittently delivering a gaseous fluid under pressure to said liquids in a direction to promote flow of the mixed liquids toward the treating vessel, a settling chamber connected with the treating vessel, and means for drawing off separated liquids from the settling chamber at different levels.

4. Apparatus of the character described, including a treating vessel, a mixing chamber, means for delivering water and oil separately to said chamber in different directions to effect impact of one liquid on the other, a nozzle leading from the mixing chamber into the treating vessel, means for intermittently delivering a gaseous fluid under pressure to said liquids in a direction to promote flow of the mixed liquids toward the treating vessel, a hood in the treating vessel enclosing the nozzle and having ports connecting its interior with the interior of said vessel, a settling chamber connected with the treating vessel, and means for drawing off separated liquids from the settling chamber at different levels.

5. Apparatus of the character described, including a treating vessel, a mixing chamber, oppositely arranged means for delivering water and oil separately to said chamber in different directions to effect impact of one liquid on the other, a nozzle leading from the mixing chamber to the treating vessel, means for intermittently delivering a gaseous fluid under pressure to said liquids in a direction to promote flow of the mixed liquids toward the treating vessel, a hood in the treating vessel enclosing the nozzle and having downwardly directed ports in its lower portion communicating with the interior of the vessel, a settling chamber connected with the treating vessel, and means for drawing off separated liquids from the settling chamber at different levels.

6. Apparatus of the character described, including a treating vessel, a mixing chamber means for delivering water and oil separately to said chamber in different directions to effect impact of one liquid on the other, a nozzle leading from the mixing chamber to the treating vessel, means for intermittently delivering a gaseous fluid under pressure to the liquids in the mixing chamber in a direction to promote flow of the mixed liquids toward the treating vessel, a hood in the treating vessel enclosing the nozzle and having downwardly directed ports in its lower portion communicating with the interior of the vessel, the bottom of the treating vessel being concaved about the hood to divert liquid discharged from said ports upwardly within said vessel, a settling chamber connected with the treating vessel, and means for drawing off separated liquids from the settling chamber at different levels.

7. Apparatus of the character described, including a treating vessel, a mixing chamber, means for delivering water and oil separately to said chamber in different directions to effect impact of one liquid on the other, a nozzle leading from the mixing chamber to the treating vessel, means for intermittently delivering a gaseous fluid under pressure to the liquids in the mixing chamber in a direction to promote flow of the mixed liquids toward the treating vessel, a hood in the treating vessel enclosing the nozzle and having downwardly directed ports in its lower portion communicating with the interior of the vessel, spaced baffle plates in the treating vessel having relatively staggered openings for effecting tortuous travel of liquid through the vessel, a settling chamber connected with the treating vessel, and means for drawing off separated liquids from the settling chamber at different levels.

8. Apparatus for treating petroleum oil including a mixing chamber, means for conducting a stream of oil to the mixing chamber, means connected with the mixing chamber and arranged in opposed relation to said first named conducting means for conducting a liquid heavier than the oil into impact with the stream of oil as the liquids enter the mixing chamber to effect mixture of said liquids, and means connected with the mixing chamber arranged between said heavier liquid conducting means and the oil conducting means for intermittently introducing slugs of a gaseous fluid into said mixture with sufficient force to separate impurities from the oil, said mixing chamber having an outlet for discharging the liquids and separated impurities.

DAN W. VINSON.